A. WALTER.
ELASTIC PEDAL CRANK FOR CYCLES.
APPLICATION FILED JULY 24, 1911.
1,021,957.
Patented Apr. 2, 1912.
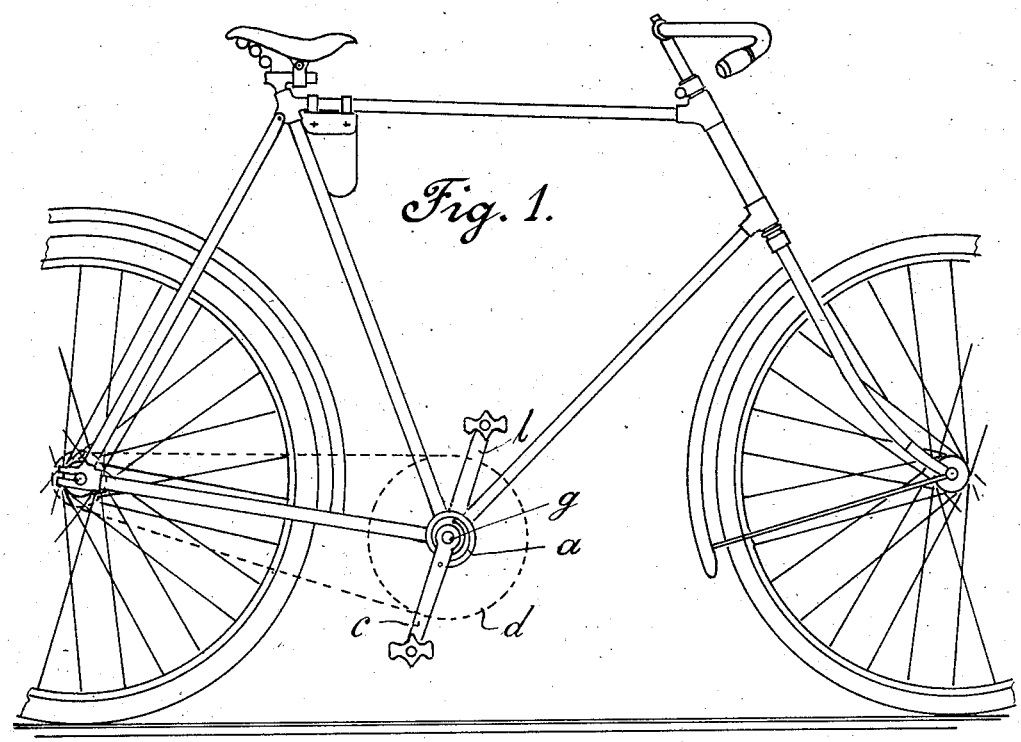
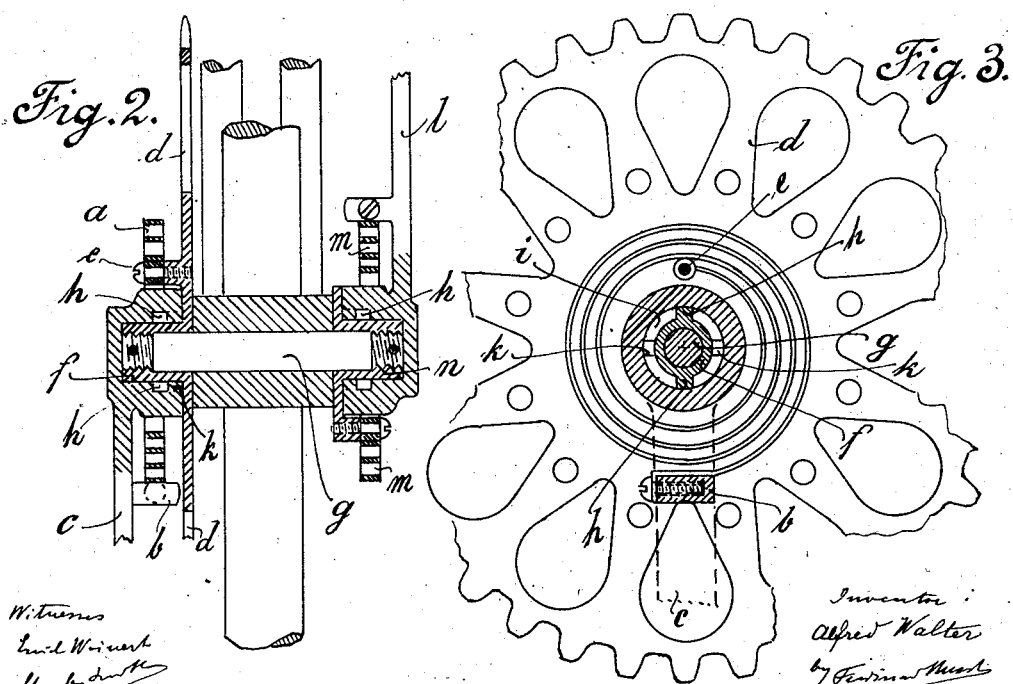

UNITED STATES PATENT OFFICE.

ALFRED WALTER, OF STRAUPITZ, GERMANY.

ELASTIC PEDAL-CRANK FOR CYCLES.

1,021,957. Specification of Letters Patent. Patented Apr. 2, 1912.

Application filed July 24, 1911. Serial No. 640,299.

*To all whom it may concern:*

Be it known that I, ALFRED WALTER, a subject of the King of Prussia, residing at Straupitz, in the Kingdom of Prussia, Germany, have invented certain new and useful Improvements in an Elastic Pedal-Crank for Cycles, of which the following is a specification.

This invention relates to pedal cranks for cycles which are constructed in such a manner that the pedal crank is connected with the chain wheel through the intermediary of a helical spring. This arrangement offers the advantage that the cyclist has to use less energy than at present, and that the corresponding parts of the cycle are not as quickly worn as is the case at present.

In the accompanying drawings the invention is shown.

Figure 1 represents in elevation a cycle with the improved device. Fig. 2 shows the chain wheel and crank in cross section. Fig. 3 is a front view partly in section of Fig. 2. Figs. 2 and 3 are shown on a larger scale than Fig. 1.

The pedal crank $c$ is connected with the chain wheel $d$ through the intermediary of a helical spring $a$, one end of which is fixed to a pin $e$ of the chain wheel $d$, its other end being fixed to a lateral extension $b$ of the crank $c$. The hub $f$ of the chain wheel $d$ is screwed upon the end of the axle $g$. This hub $f$ has two radial pins $h$ adapted to engage with an inner groove $i$ of the hub of the crank $c$ which is loosely mounted upon the hub of the chain wheel. The hub of the crank has two indentations $k$ which serve for permitting the insertion of the lateral pins $h$ of the chain wheel hub into the internal groove $i$ of the crank when the device is being put together. The ends of the helical spring $a$ are fixed to the chain wheel and to the lateral extensions $b$ of the crank by means of screws $e$, $e'$ respectively.

The device operates as follows: If the cyclist pedals, the helical spring $a$ is put under tension before the crank $c$ draws the chain-wheel $d$ along. It is evident that the second crank $l$ is mounted upon the axle $g$ through the intermediary of a helical spring $m$, the inner end of said helical spring being fixed to a lateral extension of a bush $n$ screwed upon the inner end of the axle $g$.

I claim:

An elastic crank for cycles comprising in combination with the axle of the wheel, the chain wheel keyed upon said axle by means of a hub, a bush screwed upon the other end of said axle, a lateral extension of said bush, an outer pedal crank, a hub at the upper end of said outer pedal crank loosely mounted upon the hub of the chain wheel and having an inner annular groove and two radial arms projecting from the hub of the chain wheel engaging with said inner grooves, a lateral extension of the crank and a helical spring surrounding the hub of the crank and fixed with one end to the chain wheel, and with the other end to the lateral extension of the crank, substantially as described and shown and for the purpose set forth.

In witness whereof I have hereunto set my hand in the presence of two witnesses.

ALFRED WALTER.

Witnesses:
 RUD. SCHMIDT,
 LEM S. KATZ.

Copies of this patent may be obtained for five cents each, by addressing the "Commissioner of Patents, Washington, D. C."